(12) United States Patent
Inoue et al.

(10) Patent No.: US 11,345,568 B2
(45) Date of Patent: May 31, 2022

(54) CAGE POSITION DETECTION DEVICE

(71) Applicant: MITSUBISHI ELECTRIC CORPORATION, Chiyoda-ku (JP)

(72) Inventors: Jin Inoue, Chiyoda-ku (JP); Akihide Shiratsuki, Chiyoda-ku (JP); Keita Mochizuki, Chiyoda-ku (JP); Masahiro Ishikawa, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 927 days.

(21) Appl. No.: 16/067,905

(22) PCT Filed: Mar. 15, 2016

(86) PCT No.: PCT/JP2016/058199
§ 371 (c)(1),
(2) Date: Jul. 3, 2018

(87) PCT Pub. No.: WO2017/158736
PCT Pub. Date: Sep. 21, 2017

(65) Prior Publication Data
US 2020/0055695 A1 Feb. 20, 2020

(51) Int. Cl.
*B66B 1/34* (2006.01)
*G01D 5/244* (2006.01)
*G01D 5/249* (2006.01)

(52) U.S. Cl.
CPC .......... *B66B 1/3492* (2013.01); *G01D 5/249* (2013.01); *G01D 5/24457* (2013.01)

(58) Field of Classification Search
CPC .......... B66B 1/3492; B66B 3/02; G01D 5/20; G01D 5/2006; G01D 5/2053
See application file for complete search history.

(56) References Cited

U.S. PATENT DOCUMENTS

2011/0147135 A1* 6/2011 Birrer .................. B66B 5/06
187/393
2012/0312639 A1* 12/2012 Arnold .................. B66B 1/3492
187/394
(Continued)

FOREIGN PATENT DOCUMENTS

DE 11 2013 006 754 T5 12/2015
DE 11 2014 006 714 T5 2/2017
(Continued)

OTHER PUBLICATIONS

International Search Report dated May 24, 2016 in PCT/JP2016/058199 filed Mar. 15, 2016.
(Continued)

*Primary Examiner* — Steven L Yeninas
(74) *Attorney, Agent, or Firm* — Oblon, McClelland, Maier & Neustadt, L.L.P.

(57) ABSTRACT

Provided is an apparatus configured to detect a car position by performing threshold processing on a voltage caused by an AC magnetic response through use of an identification plate in which a slit pattern is formed and a plurality of coils, the apparatus including a circuit configuration capable of switching between a normal operation for detecting the car position based on an on/off detection operation using the plurality of coils and a self-diagnosis operation capable of verifying the on/off detection operation irrespective of the presence or absence of the identification plate with a car in a stopped state by forcedly applying a magnetic field to the coils.

3 Claims, 9 Drawing Sheets

(56) References Cited

U.S. PATENT DOCUMENTS

2015/0344266 A1    12/2015   Inoue et al.
2017/0043976 A1    2/2017   Inoue et al.
2017/0066625 A1    3/2017   Shiratsuki et al.

FOREIGN PATENT DOCUMENTS

| DE | 11 2014 006 595 T5 | 4/2017 | |
|----|---|---|---|
| EP | 2 516 304 A1 | 10/2012 | |
| JP | 4397689 B2 | 10/2009 | |
| JP | 5380407 B2 | 10/2013 | |
| WO | WO 2011/076533 A1 | 6/2011 | |
| WO | WO-2016084203 A1 * | 6/2016 | ........... B66B 1/3492 |

OTHER PUBLICATIONS

Office Action dated Mar. 14, 2019 in corresponding German Patent Application No. 11 2016 006 611.2 (with English Translation), 14 pages.

\* cited by examiner

FIG. 8

| OPERATION MODE | SLIT PRESENT/ABSENT | SWITCH SHORT/OPEN | PHASE SHIFTER SHIFT AMOUNT [0°/90°] | OUTPUT AFTER PASSAGE THROUGH AMPLIFIER AMPLITUDE | OUTPUT AFTER PASSAGE THROUGH AMPLIFIER PHASE | I: IN-PHASE COMPONENT OUTPUT | Q: OUT-OF-PHASE COMPONENT OUTPUT | DETECTION COIL OUTPUT |
|---|---|---|---|---|---|---|---|---|
| MODE A: NORMAL OPERATION | PRESENT | OPEN | - | 0 | - | 0 | 0 | L |
|  | ABSENT | OPEN | - | A | 90° | 0 | A' | H |
| MODE B: L-FIXATION DIAGNOSIS | PRESENT | SHORT | 0° | B | 90° | 0 | B' | H |
|  | ABSENT | SHORT | 0° | A+B | 90° | 0 | A'+B' | H |
| MODE C: H-FIXATION DIAGNOSIS | PRESENT | SHORT | -90° | B | 0° | B' | 0 | L |
|  | ABSENT | SHORT | -90° | $\sqrt{(A^2+B^2)} \sim B$ | 0° | ~B' | ~0 | L |

FIG. 10

| OPERATION MODE | SLIT PRESENT/ABSENT | SWITCH SHORT/OPEN | PHASE SHIFTER SHIFT AMOUNT [0°/90°] | OUTPUT AFTER PASSAGE THROUGH AMPLIFIER AMPLITUDE | OUTPUT AFTER PASSAGE THROUGH AMPLIFIER PHASE | I: IN-PHASE COMPONENT OUTPUT | Q: OUT-OF-PHASE COMPONENT OUTPUT | DETECTION COIL OUTPUT |
|---|---|---|---|---|---|---|---|---|
| MODE A: NORMAL OPERATION | PRESENT | OPEN | - | 0 | - | 0 | 0 | L |
|  | ABSENT | OPEN | - | A | 90° | 0 | A' | H |
| MODE B: L-FIXATION DIAGNOSIS | PRESENT | SHORT | 90° | B | 90° | 0 | B' | H |
|  | ABSENT | SHORT | 90° | A+B | 90° | 0 | A'+B' | H |
| MODE C: H-FIXATION DIAGNOSIS | PRESENT | SHORT | 0° | B | 0° | B' | 0 | L |
|  | ABSENT | SHORT | 0° | $\sqrt{(A^2+B^2)} \sim B$ | 0° | $\sim$B' | $\sim$0 | L |

CAGE POSITION DETECTION DEVICE

TECHNICAL FIELD

The present invention relates to a car position detector capable of preventing reduction in reliability due to the misdetection of a structure in an elevator hoistway, and more particularly, to a car position detector having a self-diagnosis function.

BACKGROUND ART

There is a related-art elevator system configured such that a plurality of distance sensors are arranged in parallel on a car side and plates to be detected are arranged in parallel at each landing floor position in a manner similar to the distance sensors (see, for example, Patent Literature 1). In Patent Literature 1, the plates to be detected are arranged in combinations different depending on the landing floor, and the combination is detected by the distance sensors, to thereby identify a landing floor.

The combinations of the plates to be detected on the respective floors are stored as a database. When a currently detected combination is inconsistent with the previously detected combination with reference to the combinations in the database, it is determined that a failure state is indicated.

There is also a related-art elevator apparatus including a measuring system for determining an absolute car position (see, for example, Patent Literature 2). In Patent Literature 2, a guide rail has an absolute code mark pattern (single track magnet pattern) of pseudo-random coding arranged in an ascending/descending direction. In addition, a code reading apparatus includes a reading station for scanning n+1 consecutive code marks, and determines the absolute position of a car.

CITATION LIST

Patent Literature

[PTL 1] JP 5380407 B2
[PTL 2] JP 4397689 B2

SUMMARY OF INVENTION

Technical Problem

However, the related arts have the following problems.

In Patent Literature 1, when there is no plate to be detected, a failure diagnosis cannot be performed. Further, the distance sensors cannot perform a self-diagnosis unless the car is moved to a landing floor.

In Patent Literature 2, a scale is made of a magnet, which increases the cost of the entire apparatus. In addition, a self-diagnosis function is not included, and hence in the same manner as in Patent Literature 1, the code reading apparatus cannot perform a self-diagnosis unless the car is moved in actuality.

The present invention has been made in order to solve the above-mentioned problems, and has an object to obtain a car position detector having a function capable of carrying out a self-diagnosis for position detection without causing a car to travel.

Solution to Problem

According to one embodiment of the present invention, there is provided a car position detector, which is configured to detect a stop position when a car of an elevator is stopped on each landing floor, the car position detector including: an identification plate, which is to be provided in a hoistway on each landing floor, and is configured as a metal plate having a slit pattern formed of a plurality of slits in an ascending/descending direction of the car; a sensor, which is to be provided on a car side, and includes a plurality of coils formed of N coils each being configured to output a voltage value due to an AC magnetic response by being opposed to a part of the slit pattern and generate an output value corresponding to a part of the slit pattern of the identification plate, the plurality of coils each being formed of an exciting coil and a differential type detection coil, the sensor being configured to output voltage values obtained through detection by the differential type detection coils; a signal processor configured to perform threshold processing on the output values obtained from the respective differential type detection coils to generate detection coil output; and a test coil configured to be supplied with an exciting current flowing through the exciting coil, to thereby apply a magnetic field corresponding to an amplitude of the exciting current to the differential type detection coil, wherein the signal processor includes: a switch configured to switch between a state of supplying the test coil with the exciting current and a state of avoiding supplying the test coil with the exciting current; and a phase shifter configured to variably set a phase shift amount of the exciting current, and wherein the signal processor is configured to: set the switch to an open state and generate the detection coil output under the state of avoiding supplying the test coil with the exciting current, to thereby execute a normal operation for extracting the slit pattern; set the switch to a closed state, then switch the phase shift amount used by the phase shifter, and generate the detection coil output under the state of supplying the test coil with the exciting current that has passed through the phase shifter, to thereby execute a self-diagnosis operation; and perform quadrature detection on the output value obtained from the differential type detection coil through use of the exciting current, to thereby extract an amplitude value of a component in phase with the exciting current and an amplitude value of a component out of phase with the exciting current, and generate the detection coil output from the amplitude value of the in-phase component and the amplitude value of the out-of-phase component, to thereby extract the slit pattern at a time of the normal operation and generate, at a time of the self-diagnosis operation, the detection coil output fixedly set to any one of an H level and an L level based on the phase shift amount without depending on the slit pattern.

Advantageous Effects of Invention

According to one embodiment of the present invention, there is provided an apparatus configured to detect a car position by performing threshold processing on a voltage caused by an AC magnetic response through use of an identification plate in which a slit pattern is formed and a plurality of coils, the apparatus including a circuit configuration capable of switching between a normal operation for detecting the car position based on an on/off detection operation using the plurality of coils and a self-diagnosis operation capable of verifying the on/off detection operation irrespective of the presence or absence of the identification plate with a car in a stopped state by forcedly applying a magnetic field to the coils. As a result, it is possible to obtain the car position detector having a function capable of carrying out a self-diagnosis for position detection without causing a car to travel.

BRIEF DESCRIPTION OF DRAWINGS

FIG. 8 is a table obtained by summarizing results of a self-diagnosis executed by a signal processor 31 in the first embodiment of the present invention.

FIG. 10 is a table obtained by summarizing results of a self-diagnosis executed by the signal processor 31 in the second embodiment of the present invention.

DESCRIPTION OF EMBODIMENTS

A description is now given of a car position detector according to preferred embodiments of the present invention referring to the accompanying drawings.

First Embodiment

Figure 1:
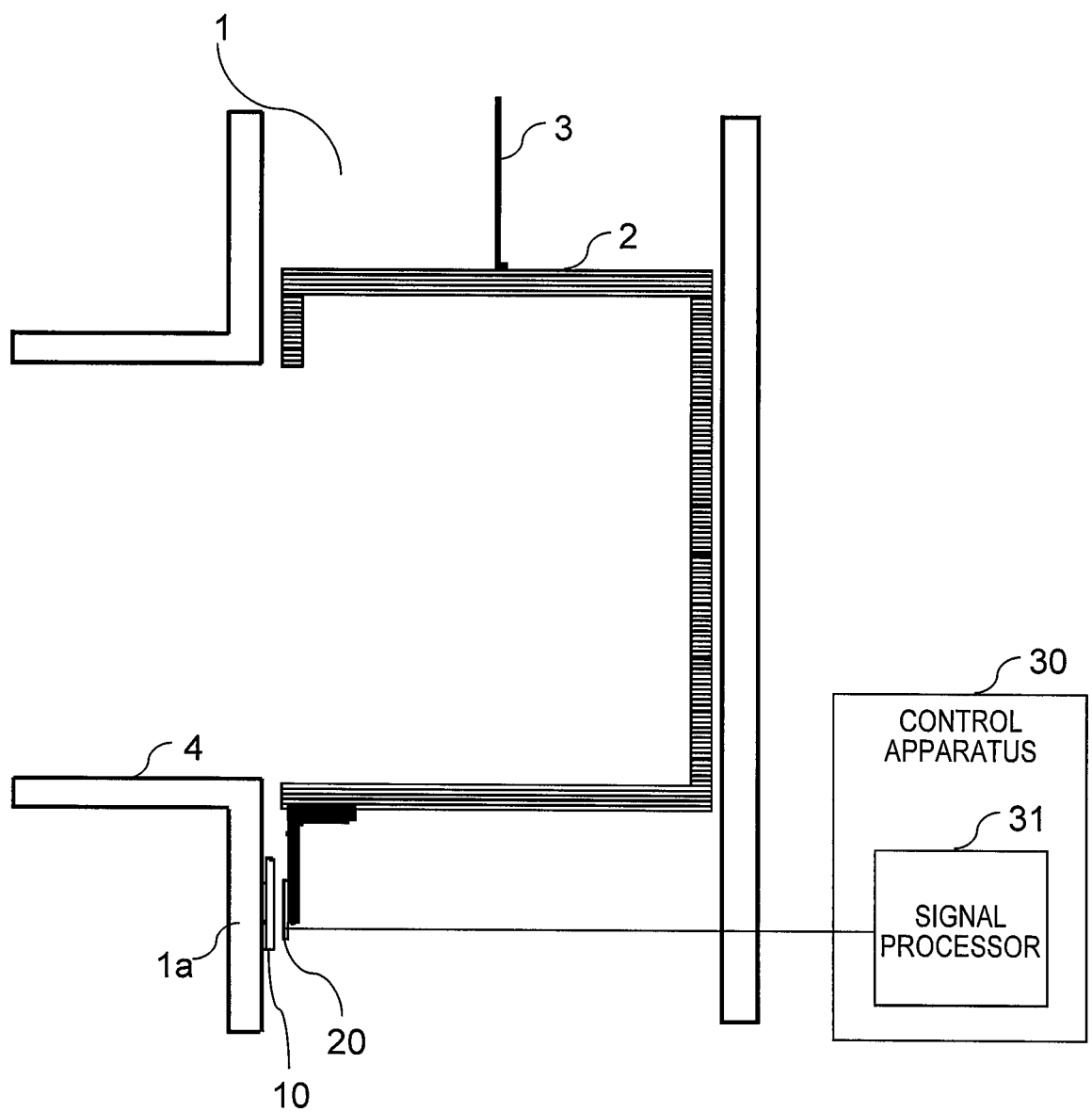
FIG. 1 is an entire configuration diagram of an elevator including a car position detector according to a first embodiment of the present invention.

FIG. 1 is an entire configuration diagram of an elevator including a car position detector according to a first embodiment of the present invention. A car (elevating body) 2 and a counterweight (not shown) are provided in a hoistway 1. The car 2 and the counterweight are individually guided by a plurality of rails (not shown), which are provided in the hoistway 1, to be moved in the hoistway 1 in a vertical direction via a rope 3 by a driving force of a hoisting machine (driving apparatus) (not shown).

In the hoistway 1, identification plates 10 serving as a plurality of members to be detected are fixed. The identification plates 10 are respectively arranged at a plurality of reference positions set to be spaced apart from each other with respect to a moving direction of the car 2. In the first embodiment, the identification plate 10 is provided in order to detect a stopped state of the car 2 at the position of a hall floor surface 4, and a position corresponding to each floor is set as the reference position. In FIG. 1, only one identification plate 10 provided at a given landing floor is illustrated as an example.

The lower part of the car 2 is provided with a sensor (detector) 20 for detecting the identification plate 10 arranged on each floor. A signal received from the sensor 20 is sent to a control apparatus 30 configured to control the operation of the elevator. The control apparatus 30 includes a signal processor 31 configured to identify the position of the car 2 by processing the signal received from the sensor 20. The control apparatus 30 controls the operation of the elevator based on the position of the car 2 identified by the signal processor 31.

The car position detector according to the first embodiment includes the plurality of identification plates 10, the sensor 20, and the signal processor 31. Now, the respective components of the car position detector according to the first embodiment are described in detail prior to the description of a self-diagnosis function.

Figure 2:
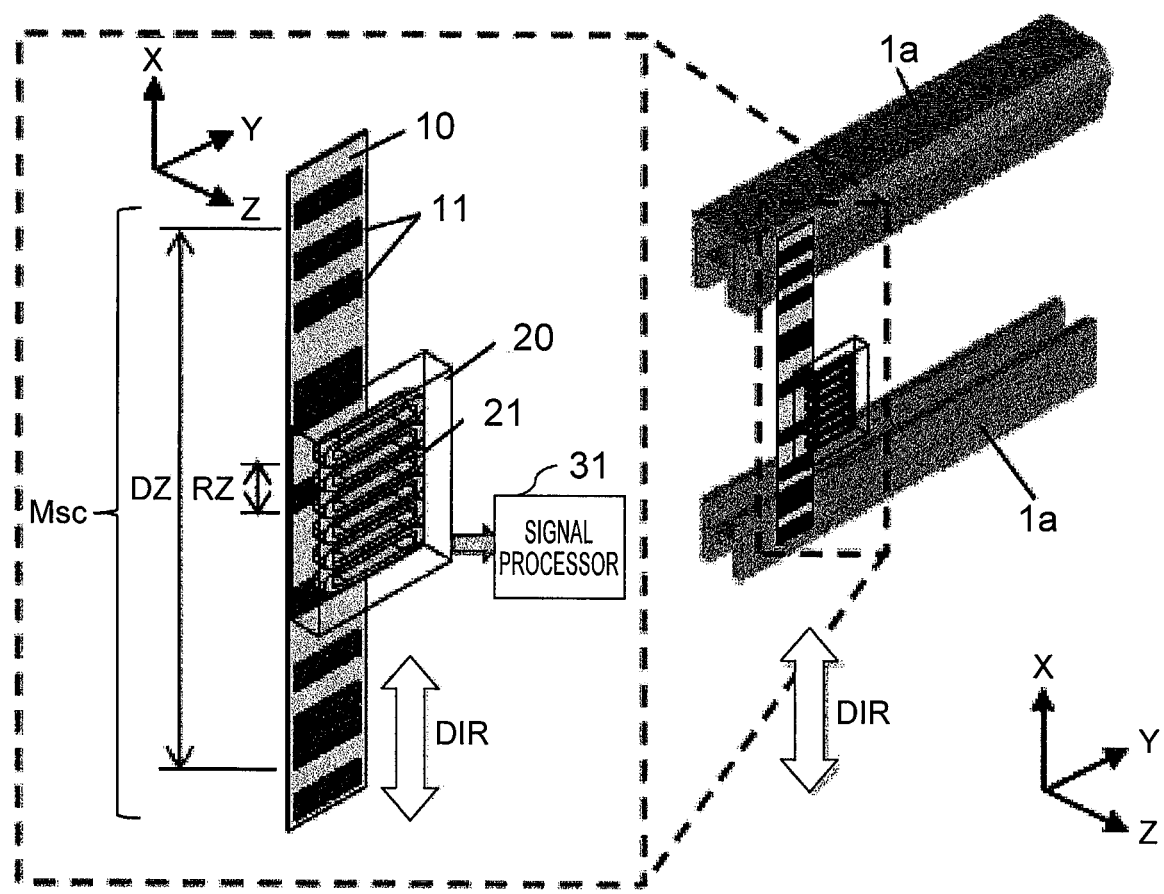
FIG. 2 is a diagram for illustrating a detailed configuration of the car position detector according to the first embodiment of the present invention.

FIG. 2 is a diagram for illustrating a detailed configuration of the car position detector according to the first embodiment of the present invention. In FIG. 2, reference symbols Msc, DZ, RZ, and DIR have the following meanings, respectively.

Msc: M-sequence code (pseudo-random code) based on the presence or absence of a slit
DZ: door zone
RZ: re-level zone
DIR: ascending/descending direction The identification plate 10 is configured as a metal plate having slits 11, and is provided on a hoistway structure 1a at a landing position on each floor. Therefore, the identification plates 10 are separately arranged on the respective floors to avoid being provided over the entire length of the hoistway.

In addition, the slits 11 provided in the identification plate 10 are arranged so as to reproduce an M-sequence code through the reading of the presence or absence of the slit 11 by an on/off signal based on a voltage value obtained through detection by the sensor 20. In the first embodiment, the identification plates 10 provided on the respective landing floors are all formed of the same slit pattern, and all reproduce the same M-sequence code.

The sensor 20 includes a plurality of coils 21, and extracts a voltage (amplitude voltage) generated in each of the coils 21 due to an AC magnetic response between the coil 21 and the identification plate 10. Then, the signal processor 31 performs threshold processing on the increase or decrease of the amplitude voltage corresponding to the absence or presence of the slit 11 in the identification plate 10, to thereby determine H or L. Then, the signal processor 31 acquires a code sequence from the results of determining H or L by the plurality of coils 21.

In addition, the signal processor 31 detects a specific code sequence that sequentially changes based on the slit pattern while the relative positions of the identification plate 10 and the sensor 20 are changed in accordance with the ascending or descending of the car 2 in the hoistway 1. While detecting the specific code sequence, the signal processor 31 individually identifies the detected code sequence, to thereby be able to detect a boundary position between the presence and absence of a slit.

When the specific code sequence fails to be detected, the signal processor 31 can determine that the input is erroneous input to avoid performing the subsequent processing. That is, the signal processor 31 performs position detection only when the specific code sequence based on the slit pattern is detected, to thereby be able to prevent the misdetection of the position even when the sensor 20 responds to a hoistway structure or an object other than the identification plate 10.

In addition, when detecting a code sequence corresponding to the door zone or a code sequence corresponding to the re-level zone, the signal processor 31 turns on door zone output or re-level zone output based on the detection result, to thereby be able to inform the control apparatus 30 of a landed state.

Figure 3:
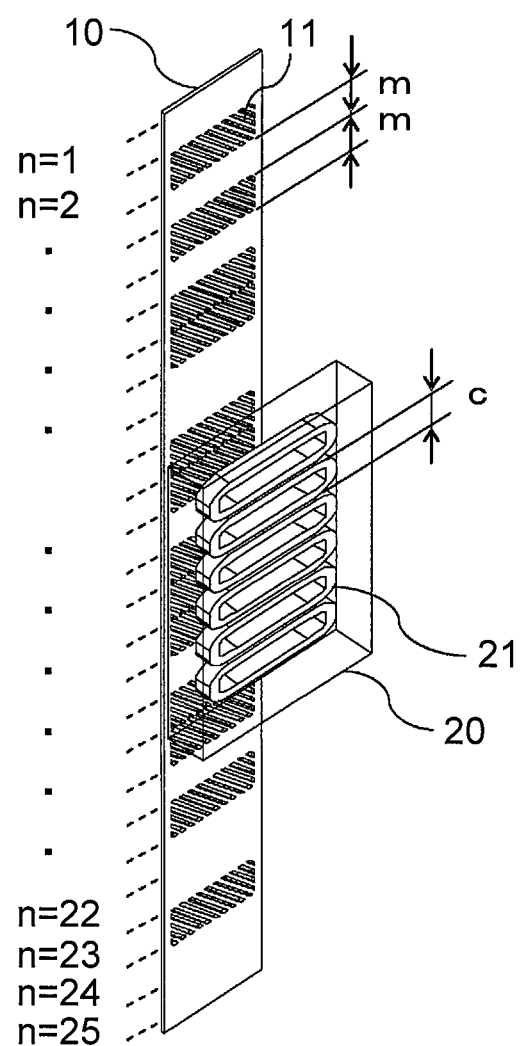
FIG. 3 is a diagram for illustrating a specific layout of an identification plate and a sensor including a plurality of coils in the first embodiment of the present invention.
Figure 4:
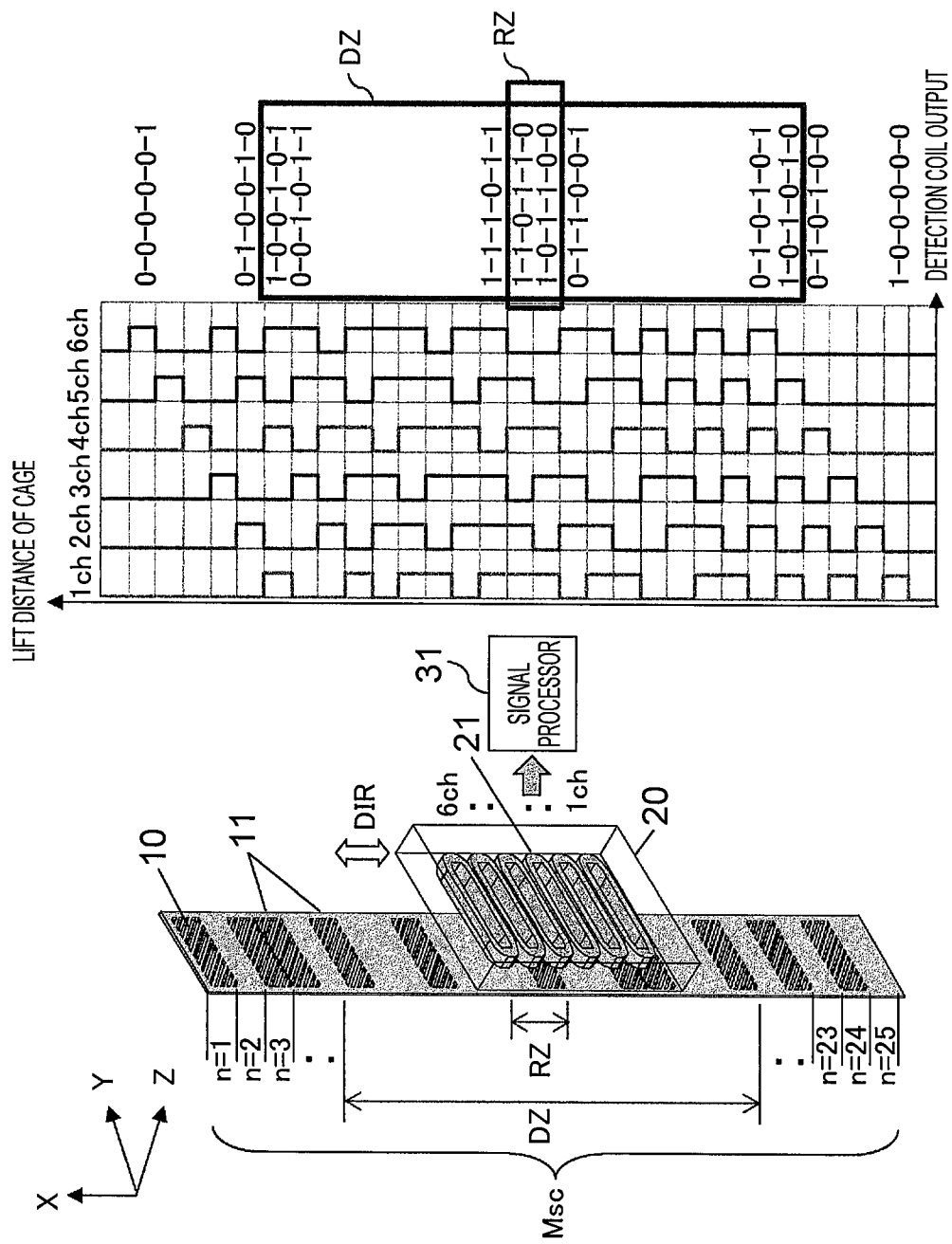
FIG. 4 is a diagram for illustrating a correspondence relationship between an M-sequence code corresponding to a slit pattern and each of a door zone and a re-level zone in the first embodiment of the present invention.

Next, specific configurations of the identification plate 10 and the sensor 20 for generating an M-sequence code as the specific code sequence, are described with reference to FIG. 3 and FIG. 4. FIG. 3 is a diagram for illustrating a specific layout of the identification plate 10 and the sensor 20 including the plurality of coils 21 in the first embodiment of the present invention. FIG. 4 is a diagram for illustrating a correspondence relationship between the M-sequence code corresponding to the slit pattern and each of the door zone and the re-level zone in the first embodiment of the present invention.

In FIG. 4, reference symbols Msc, DZ, RZ, and DIR have the same meanings as those of the reference symbols in FIG. 2. Code sequences read on six channels are illustrated as one-zero patterns on the right end of FIG. 4.

First, the numbers of coils 21 and slits 11 and the dimensions thereof are described. Assuming that the re-level zone is a mm with the door zone being b mm (where a<b), a length m of each of the slits 11 is a common divisor of a and b.

In order to determine the position from a b/m-bit pseudo-random number (M-sequence), it is required to read, from the M-sequence, data having bits equal to or larger than p bits, where p satisfies Expression (1).

$$2p-1 \geq b/m+(p-1) \times 2 \quad (1)$$

That is, as illustrated in FIG. 4, in a code sequence obtained by adding b/m bits corresponding to the door zone and two sets of (p−1) bits on both sides thereof, it is required to satisfy Expression (1) being an inequality in terms of 2p−1 being the cycle of the M-sequence in order to prevent the occurrence of duplicate p-bit codes.

Meanwhile, the plurality of coils 21 included in the sensor 20 are formed as p coils 21. A pitch between the adjacent coils is the same as the length m of the slit 11, and a length c of each of the coils is as follows:

$$c \leq m.$$

The M-sequence is generated from Expression (2) being a recurrence formula.

$$M(n)=M(n-p) \text{ XOR } M(n-q)(p>q) \quad (2)$$

initial values: M(1), M(2), ... M(p)
In Expression (2), XOR represents exclusive OR.
As a specific example, assuming that:
a=20 mm;
b=300 mm; and
m=20 mm (corresponding to the greatest common divisor of a and b),
a/m=1 and
b/m=15
are obtained, and p satisfying Expression (2) is obtained as:

$$p \geq 5.$$

However, as a countermeasure against the misdetection due to the hoistway structure, it is appropriate to eliminate an M-sequence in which a code sequence generated from output values obtained from the plurality of coils 21 includes one or no bit indicating H or L. That is, the code sequence extracted as p bits always includes two or more bits indicating H and two or more bits indicating L, which can reduce factors in misdetection. To that end, p is set as follows:

$$p \geq 6.$$

FIG. 4 is an illustration of a specific positional relationship between the M-sequence code and each of the re-level zone and the door zone, which is exhibited when p is set to 6 in the above-mentioned manner. In the example of FIG. 4, while the car is descending, the signal processor 31 can determine that the car has entered the door zone by reading a code sequence of 1-0-0-1-0-1 corresponding to n=1 to 6, and can further determine that the car has entered the re-level zone by reading a code sequence of 1-1-0-1-1-0 corresponding to n=7 to 12.

Similarly, while the car is ascending, the signal processor 31 can determine that the car has entered the door zone by reading a code sequence of 1-0-1-0-1-0 corresponding to n=20 to 25, and can further determine that the car has entered the re-level zone by reading a code sequence of 1-0-1-1-0-0 corresponding to n=13 to 18.

Figure 5:
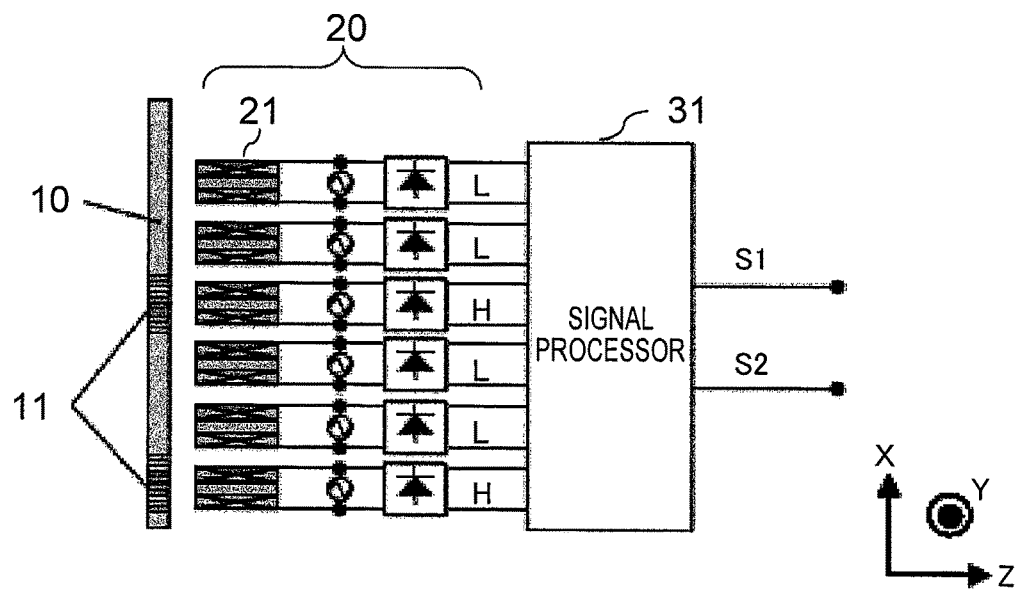
FIG. 5 is a schematic diagram of the car position detector according to the first embodiment of the present invention.

FIG. 5 is a schematic diagram of the car position detector according to the first embodiment of the present invention. FIG. 5 is an illustration of an exemplary case in which p is set to 6, and the signal processor 31 extracts a voltage (amplitude voltage) generated due to the AC magnetic response of each of six coils 21. Then, as described above, the signal processor 31 performs the threshold processing on the extracted voltage values to generate a code sequence, determines whether or not the door zone or the re-level zone has been entered based on the code sequence, and outputs a result of the determination. In FIG. 5, the signal processor 31 outputs a signal S1 when the door zone has been detected, and outputs a signal S2 when the re-level zone has been detected.

Figure 6:
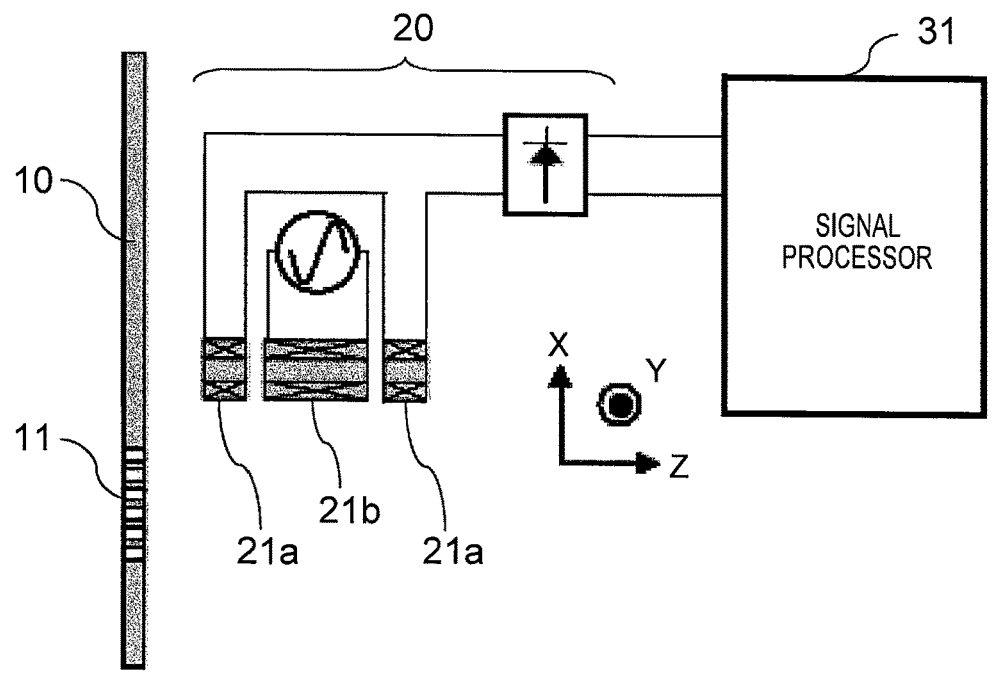
FIG. 6 is a schematic diagram of a car position detector different from that of FIG. 5 according to the first embodiment of the present invention.

FIG. 6 is a schematic diagram of a car position detector different from that of FIG. 5 according to the first embodiment of the present invention. A configuration illustrated in FIG. 6 is different from the configuration of FIG. 5 in the configuration of the coil 21, which is mainly described below. In order to simplify the drawing, only coils corresponding to one channel are illustrated in FIG. 6, but p sets of such coils are provided in parallel in actuality.

As illustrated in FIG. 6, the plurality of coils 21 are each formed of a pair of differential type detection coils 21a and an exciting coil 21b sandwiched by the pair of differential type detection coils 21a.

When such a coil configuration is employed, only an eddy current magnetic field can be picked up from the output from the differential type detection coils 21a. As a result, the signal processor 31 can detect a position at which the identification plate 10 is absent or the position of the slit 11 in the identification plate 10 by a state under which there is no output from the differential type detection coils 21a, and can detect the output from the differential type detection coils 21a only at the position at which there is no slit 11 in the identification plate 10.

When the detection coil formed of an exciting coil and differential type detection coils is employed as illustrated in FIG. 6, an excitation magnetic field from the exciting coil can be prevented from being picked up. As a result, it is possible to improve the detection S/N of a non-slit portion of the identification plate 10.

In order to improve the detection S/N, the signal processor 31 may determine H or L by acquiring not only an amplitude value of output from the detection coil but also a phase thereof.

Figure 7:
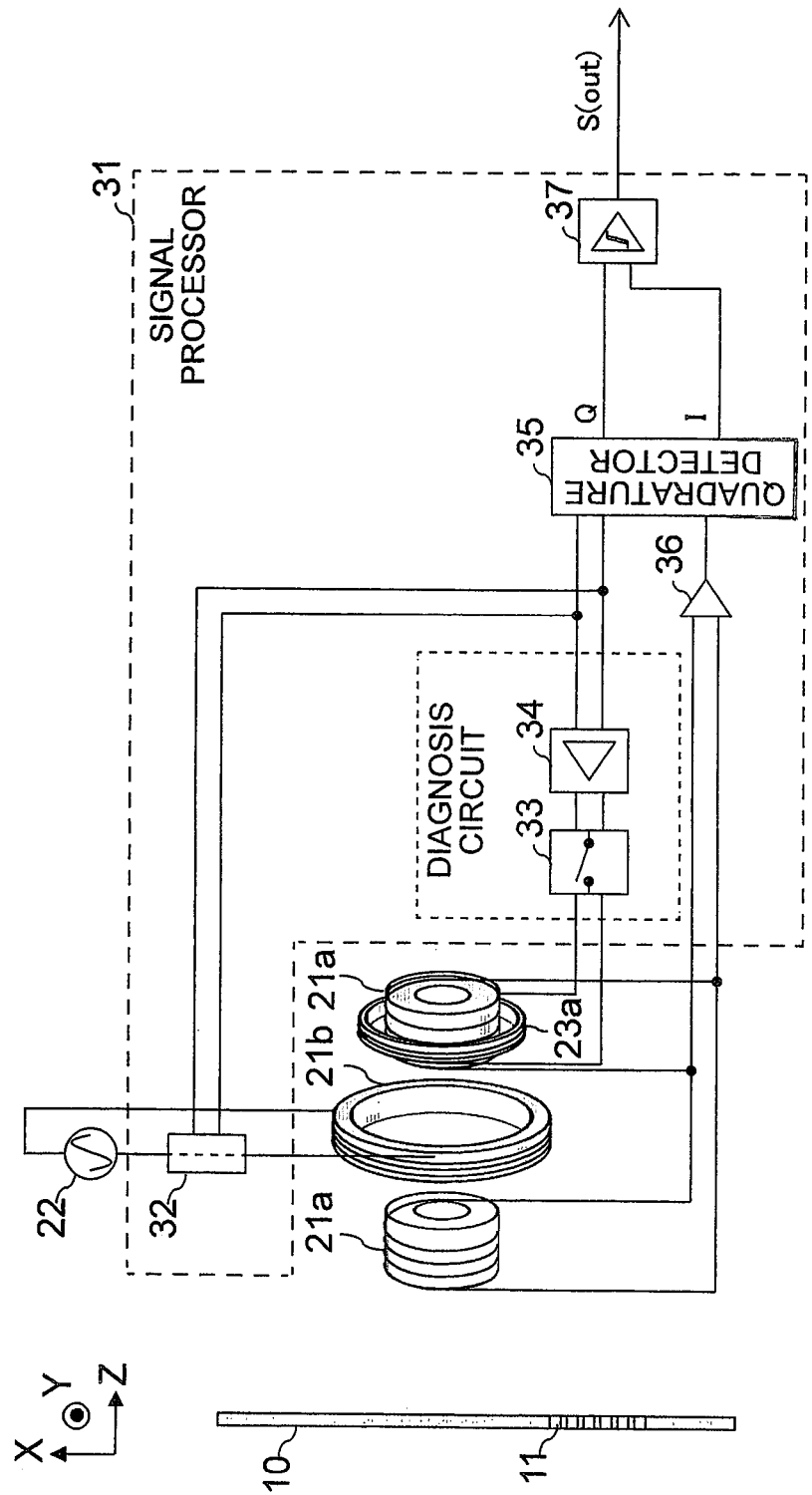
FIG. 7 is a configuration diagram of the car position detector having a self-diagnosis function according to the first embodiment of the present invention.

Next, a configuration obtained by adding a self-diagnosis function to the car position detector having a circuit configuration illustrated in FIG. 6 is described in detail with reference to FIG. 7 and FIG. 8. FIG. 7 is a configuration diagram of the car position detector having the self-diagnosis function according to the first embodiment of the present invention. In order to simplify the drawing, only coils corresponding to one channel are illustrated in FIG. 7.

The coil 21 having a configuration illustrated in FIG. 7 includes a test coil 23a for achieving a self-diagnosis as well as the pair of differential type detection coils 21a and the exciting coil 21b sandwiched by the pair of differential type detection coils 21a. In this case, the test coil 23a is provided to the outer periphery of one differential type detection coil 21a of the pair of differential type detection coils 21a.

The signal processor 31 illustrated in FIG. 7 includes a current detector 32, a switch 33, a phase shifter 34, a quadrature detector 35, an amplifier 36, and a slit presence/absence determinator 37. The current detector 32 is connected between the exciting coil 21b and an excitation source 22, and serves as a current source.

In addition, the output of the current detector 32 is connected to the phase shifter 34 and the quadrature detector 35. The current detector 32 is configured to be able to supply, as the current source, an exciting current flowing through the exciting coil 21b to the phase shifter 34 and the quadrature detector 35.

Meanwhile, the test coil 23a newly added for a self-diagnosis is connected to a diagnosis circuit formed of the switch 33 and the phase shifter 34. The test coil 23a is supplied with the exciting current from the current detector 32 via the diagnosis circuit. As a result, a magnetic field corresponding to the magnitude of the exciting current is applied to the differential type detection coil 21a.

When the switch 33 is in an off state, the pair of differential type detection coils 21a output only a voltage caused by an eddy current magnetic field from the identification plate 10. When the switch 33 is in an on state, the pair of differential type detection coils 21a output a combined voltage of the voltage caused by the eddy current magnetic field from the identification plate 10 and a voltage caused by a magnetic field from the test coil 23a. The voltage output from the pair of differential type detection coils 21a is input to the quadrature detector 35 via the amplifier 36.

The quadrature detector 35 uses the exciting current supplied from the current detector 32 to perform quadrature detection on a voltage component obtained through the amplifier 36. That is, the quadrature detector 35 splits the voltage component obtained through the amplifier 36 into an amplitude value I of a component in phase with the exciting current (in-phase component output) and an amplitude value Q of a component out of phase by ±90° (out-of-phase component output).

The slit presence/absence determinator 37 generates detection coil output based on the values Q and I. Specifically, when conditions of:

$$Q>I \quad (3); \text{ and}$$

$$Q>>0 \quad (4)$$

are established, the slit presence/absence determinator 37 sets the detection coil output to H, and when the conditions of Expressions (3) and (4) are not established, sets the detection coil output to L. In FIG. 7, a signal corresponding to the detection coil output is illustrated as S(out).

The slit presence/absence determinator 37 can set a threshold value for the determination of Expression (4) in advance to determine whether or not Q is equal to or larger than the value for the determination.

Next, a self-diagnosis method using the signal processor 31 having such a configuration is described in detail. FIG. 8 is a table obtained by summarizing results of a self-diagnosis executed by the signal processor 31 in the first embodiment of the present invention. In FIG. 8, the following three types of modes, namely, Mode A to Mode C, are shown.

Mode A: a mode for reading the M-sequence code based on the presence or absence of the slit at the time of a normal operation. Mode A is executed when the switch 33 is set to OPEN.

Mode B: a mode capable of forcedly creating a state under which the detection coil output is an H level when a position detection function is normal at the time of a self-diagnosis. In Mode B, a state under which the detection coil output is fixed to L for some reason can be detected as an abnormality.

Mode C: a mode capable of forcedly creating a state under which the detection coil output is an L level when the position detection function is normal at the time of a self-diagnosis. In Mode C, a state under which the detection coil output is fixed to H for some reason can be detected as an abnormality.

In this case, possible reasons that L-fixation or H-fixation occurs include a break or short circuit relating to wirings, a failure of an electric device relating to the position detection, a defect of an output contact, or the like. The signal processor 31 carries out the self-diagnosis in Mode B or Mode C, to thereby be able to diagnose whether or not the position detection function is normally operating without involving an occurrence of the L-fixation or the H-fixation even when a reason for a failure cannot be identified.

Next, with reference to FIG. 8, specific operations in Mode A at the time of the normal operation and in Mode B and Mode C at the time of the self-diagnosis are described in detail in the stated order.

[Description of Operation in Mode A]

At the time of the normal operation in Mode A, the switch 33 is set to OPEN. Under this state, a magnetic field ascribable to the test coil 23a does not occur, and hence the signal processor 31 processes the output from the differential type detection coil 21a as it is, to thereby be able to execute the above-mentioned position detection based on the M-sequence code.

Specifically, when the slit 11 is absent, the differential type detection coil 21a outputs an eddy current magnetic field from the identification plate 10 as a voltage. The output after the passage through the amplifier 36 is shifted by 90° with respect to the exciting current.

Therefore, the output after the passage through the amplifier 36 is subjected to the quadrature detection by the exciting current supplied via the current detector 32, to thereby be able to split into the amplitude value I of the in-phase component and the amplitude value Q of the component out of phase by ±90°.

In this case, the output after the passage through the amplifier 36 and the exciting current have the phases shifted by 90°. Therefore, the output from the quadrature detector 35 is as follows:

$$I=0; \text{ and}$$

$$Q=A'\neq 0.$$

As a result, Expressions (3) and (4) are established, and hence the slit presence/absence determinator 37 sets the detection coil output to H.

Meanwhile, when the slit 11 is present, the differential type detection coil 21a avoids detecting an eddy current magnetic field from the identification plate 10. For this reason, the voltage is zero. Therefore, the output from the quadrature detector 35 is as follows:

$$I=Q=0.$$

As a result, Expressions (3) and (4) are not established, and hence the slit presence/absence determinator 37 sets the detection coil output to L.

As apparent from the description given above, at the time of the normal operation in Mode A, by setting the switch 33 to OPEN, it is possible to obtain the detection coil output to become L when the occurrence of an eddy current magnetic field is not involved with the slit 11 being present and become H when an eddy current occurs with the slit 11 being absent.

[Description of Operation in Mode B]

At the time of a self-diagnosis operation for determining the abnormality of the L-fixation in Mode B, the switch 33 is set to SHORT, and the phase shift of a phase shifter is set to 0°. Under this state, the test coil 23a functions to apply a magnetic field caused by the exciting current to the differential type detection coil 21a.

Therefore, the output after the passage through the amplifier 36 is a combination of the voltage (amplitude A, having the phase shifted by 90° with respect to the exciting current) caused by the eddy current magnetic field from the identification plate 10 and the voltage (amplitude B, having the phase shifted by 90° with respect to the exciting current) caused by the test coil 23a. In this case, the amplitude A and the amplitude B have a relationship of:

$$B>>A.$$

When the slit 11 is absent, an eddy current magnetic field occurs, and hence the differential type detection coil 21a outputs the combined voltage of the voltage caused by the eddy current magnetic field from the identification plate 10 and the voltage caused by the test coil 23a.

The output after the passage through the amplifier 36 is shifted by 90° with respect to the exciting current. Therefore, the output from the quadrature detector 35 is as follows:

$$I=0; \text{ and}$$

$$Q=A'+B'(B'>>A').$$

As a result, Expressions (3) and (4) are established, and hence the slit presence/absence determinator 37 sets the detection coil output to H.

Meanwhile, when the slit 11 is present, the differential type detection coil 21a avoids detecting an eddy current magnetic field from the identification plate 10. Therefore, the voltage output from the differential type detection coil 21a is only the voltage (amplitude B, having the phase shifted by 90° with respect to the exciting current) caused by the test coil 23a.

In this case, the output after the passage through the amplifier 36 is shifted by 90 with respect to the exciting current. Therefore, the output from the quadrature detector 35 is as follows:

$$I=0; \text{ and}$$

$$Q=B'\neq 0.$$

As a result, Expressions (3) and (4) are established also when the slit 11 is present, and hence the slit presence/absence determinator 37 sets the detection coil output to H.

As apparent from the description given above, at the time of the self-diagnosis operation in Mode B, by setting the switch 33 to SHORT and setting the phase shifter 34 at 0°, it is possible to obtain the detection coil output having the H level irrespective of the presence or absence of the slit. Therefore, it is possible to detect that, when the detection coil output becomes L through the self-diagnosis in Mode B, such a failure that the output from the signal processor 31 is fixed to the L level has occurred.

[Description of Operation in Mode C]

At the time of a self-diagnosis operation for determining the abnormality of the H-fixation in Mode C, the switch 33 is set to SHORT, and the phase shift of a phase shifter is set to −90°. Under this state, the test coil 23a functions to apply a magnetic field caused by the exciting current to the differential type detection coil 21a.

Therefore, the output after the passage through the amplifier 36 is a combination of the voltage (amplitude A, having the phase shifted by 90° with respect to the exciting current) caused by the eddy current magnetic field from the identification plate 10 and the voltage (amplitude B, having the phase shifted by 0° with respect to the exciting current) caused by the test coil 23a. In this case, the amplitude A and the amplitude B have a relationship of:

$$B>>A.$$

When the slit 11 is absent, the differential type detection coil 21a outputs the combined voltage of the voltage caused by the eddy current magnetic field from the identification plate 10 and the voltage caused by the test coil 23a.

The output after the passage through the amplifier 36 has the phase substantially at 0° without being shifted with respect to the exciting current because B>>A is satisfied. Therefore, the output from the quadrature detector 35 is as follows:

$$I=B'; \text{ and}$$

$$Q=0.$$

As a result, Expressions (3) and (4) are not established, and hence the slit presence/absence determinator 37 sets the detection coil output to L.

Meanwhile, when the slit 11 is present, the differential type detection coil 21a avoids detecting an eddy current magnetic field from the identification plate 10. Therefore, the voltage output from the differential type detection coil 21a is only the voltage (amplitude B, having the phase shifted by 0° with respect to the exciting current) caused by the test coil 23a.

The output after the passage through the amplifier 36 has the phase substantially at 0° without being shifted with respect to the exciting current. Therefore, the output from the quadrature detector 35 is as follows:

$$I=B'; \text{ and}$$

$$Q=0.$$

As a result, Expressions (3) and (4) are not established also when the slit 11 is present, and hence the slit presence/absence determinator 37 sets the detection coil output to L.

As apparent from the description given above, at the time of the self-diagnosis operation in Mode C, by setting the switch 33 to SHORT and setting the phase shifter 34 at −90°, it is possible to obtain the detection coil output having the L level irrespective of the presence or absence of the slit. Therefore, it is possible to detect that, when the detection coil output becomes H through the self-diagnosis in Mode C, such a failure that the output from the signal processor 31 is fixed to the H level has occurred.

As described above, in Mode B and Mode C, the self-diagnosis can be carried out irrespective of the presence or absence of the slit. Therefore, the self-diagnosis regarding the position detection function can be carried out while the car is in a stopped state both in a place in which the identification plate 10 is present and in a place in which the identification plate 10 is absent.

The self-diagnosis can also be carried out at an appropriate timing depending on the purpose by, for example, repeating a cycle of executing the operations in Mode B and Mode C after the operation in Mode A is executed or periodically executing Mode B and Mode C.

As described above, according to the first embodiment, at the time of normal traveling, it is possible to execute the position detection by detecting the M-sequence code using a plurality of coils. In addition, according to the configuration of the first embodiment, at the time of the self-diagnosis, by generating a magnetic field corresponding to the exciting current, it is possible to fix the output for the position detection to any one of the H level and the L level as intended at a freely-selected stop position irrespective of the presence or absence of the occurrence of an eddy current magnetic field. As a result, the self-diagnosis regarding such a failure that the output is fixed to the H level and such a failure that the output is fixed to the L level can be performed at a desired timing while the car is in a stopped state at a freely-selected position.

Second Embodiment

Now, a description is given of a car position detector according to a second embodiment of the present invention, which is capable of producing the same effect by including a second test coil in addition to the components of the above-mentioned first embodiment.

Figure 9:
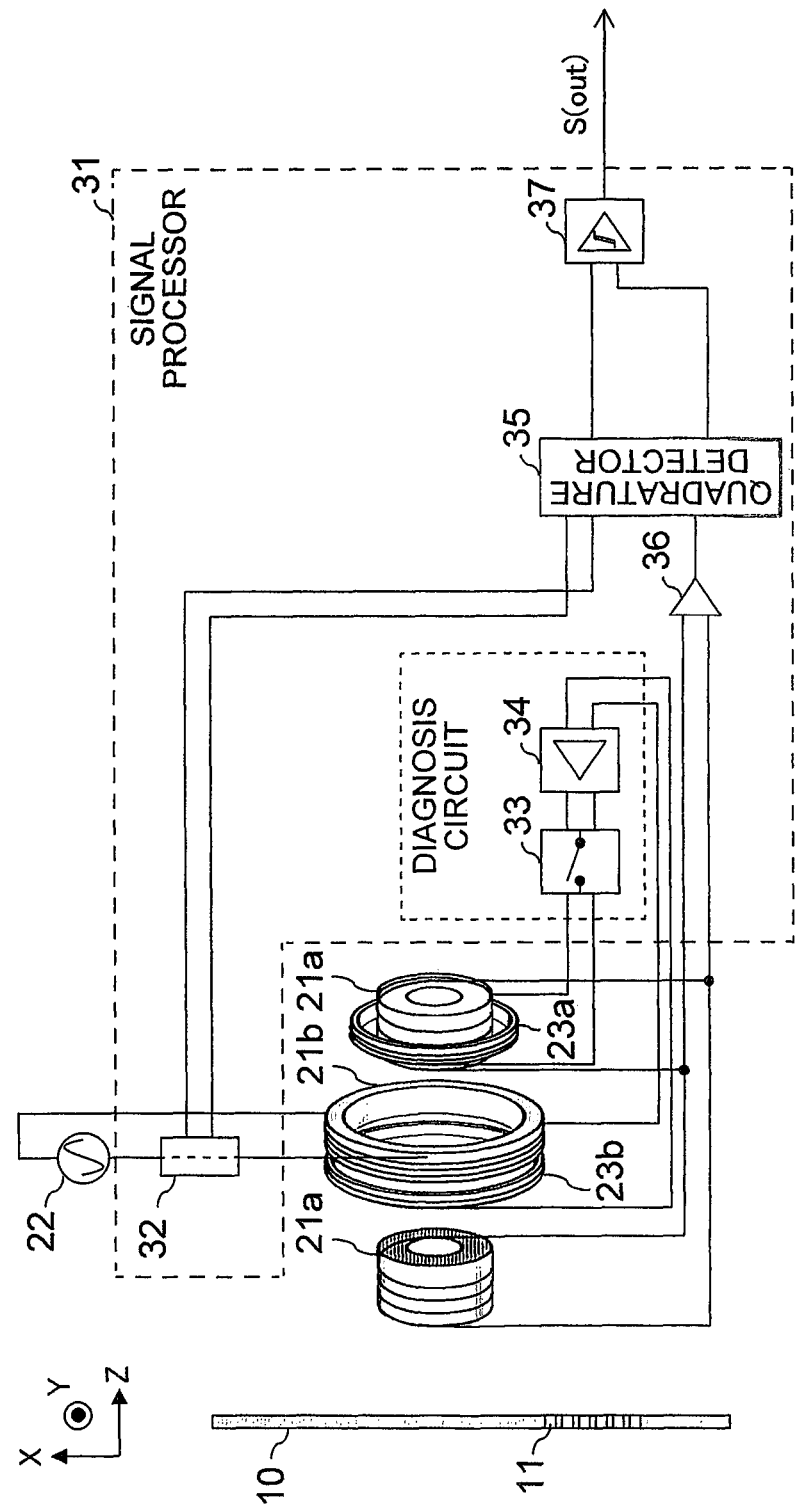
FIG. 9 is a configuration diagram of a car position detector having a self-diagnosis function according to a second embodiment of the present invention.

FIG. 9 is a configuration diagram of the car position detector having the self-diagnosis function according to the second embodiment of the present invention. In order to simplify the drawing, only coils corresponding to one channel are illustrated in FIG. 9. In FIG. 9, the signal corresponding to the detection coil output is illustrated as S(out).

A configuration of FIG. 9 in the second embodiment is different from the configuration of FIG. 7 in the above-mentioned first embodiment in that a test coil 23*b* is further included and is connected to the input of the phase shifter 34 and that a current from the test coil 23*b* is input to the phase shifter 34. Therefore, those differences are mainly described below.

The coil 21 having a configuration illustrated in FIG. 9 includes the test coil 23*a* and the test coil 23*b* for achieving a self-diagnosis as well as the pair of differential type detection coils 21*a* and the exciting coil 21*b* sandwiched by the pair of differential type detection coils 21*a*. In this case, the test coil 23*a* is a test coil similar to that in the above-mentioned first embodiment, and is provided to the outer periphery of one differential type detection coil 21*a* of the pair of differential type detection coils 21*a*. Meanwhile, the test coil 23*b* newly added in the second embodiment is arranged so as to be opposed to the exciting coil 21*b* with a certain gap.

In addition, a phase difference between a current guided to the test coil 23*b* and an exciting current obtained via the current detector 32 is −90°. In the second embodiment, the current guided to the test coil 23*b* is also input to the phase shifter 34. Therefore, unlike in the above-mentioned first embodiment, in the second embodiment, at the time of the self-diagnosis in Mode B and Mode C, a phase shift amount used by the phase shifter 34 is shifted by 90°. Operations to be performed after the operation performed by the phase shifter 34 are the same as those of the above-mentioned first embodiment.

FIG. 10 is a table obtained by summarizing results of a self-diagnosis executed by the signal processor 31 in the second embodiment of the present invention. As shown in FIG. 10, in the second embodiment, when the self-diagnosis in Mode B is performed, the phase shift amount for the phase shifter 34 is set to 90°, and when the self-diagnosis in Mode C is performed, the phase shift amount for the phase shifter 34 is set to 0°. The other operations are the same as those of the above-mentioned first embodiment.

As described above, according to the second embodiment, with such a configuration as illustrated in FIG. 9, it is possible to achieve the self-diagnosis function of the above-mentioned configuration of FIG. 7. In addition, according to the configuration of the second embodiment, a diagnosis circuit formed of a switch and a phase shifter can be connected to an excitation source via a test coil without the intermediation of a current detector. As a result, even when an abnormality has occurred in a current source, an adverse influence of the abnormality can be hardly exerted, which can further produce an effect.

The invention claimed is:

1. A car position detector, which is configured to detect a stop position when a car of an elevator is stopped on each landing floor, the car position detector comprising:
   an identification plate, which is to be provided in a hoistway on each landing floor, and is configured as a metal plate having a slit pattern formed of a plurality of slits in an ascending/descending direction of the car;
   a sensor, which is to be provided on a car side, and includes a plurality of coils formed of N coils each being configured to output a voltage value due to an AC magnetic response by being opposed to a part of the slit pattern and generate an output value corresponding to a part of the slit pattern of the identification plate, the plurality of coils each being formed of an exciting coil and a differential type detection coil, the sensor being configured to output voltage values obtained through detection by the differential type detection coils;
   a signal processor configured to perform threshold processing on the output values obtained from the respective differential type detection coils to generate detection coil output; and
   a test coil configured to be supplied with an exciting current flowing through the exciting coil, to thereby apply a magnetic field corresponding to an amplitude of the exciting current to the differential type detection coil,
   wherein the signal processor includes:
      a switch configured to switch between a state of supplying the test coil with the exciting current and a state of avoiding supplying the test coil with the exciting current; and
      a phase shifter configured to variably set a phase shift amount of the exciting current, and
   wherein the signal processor is configured to:
      set the switch to an open state and generate the detection coil output under the state of avoiding supplying the test coil with the exciting current, to thereby execute a normal operation for extracting the slit pattern;
      set the switch to a closed state, then switch the phase shift amount used by the phase shifter, and generate the detection coil output under the state of supplying the test coil with the exciting current that has passed through the phase shifter, to thereby execute a self-diagnosis operation; and perform quadrature detection on the output value obtained from the differential type detection coil through use of the exciting current, to thereby extract an amplitude value of a component in phase with the exciting current and an amplitude value of a component out of phase with the exciting current, and generate the detection coil output from the amplitude value of the in-phase component and the amplitude value of the out-of-phase component, to thereby extract the slit pattern at a time of the normal operation and generate, at a time of the self-diagnosis operation, the detection coil output fixedly set to any one of an H level and an L level based on the phase shift amount without depending on the slit pattern.

2. A car position detector according to claim 1, further comprising a current detector, which is to be connected between the exciting coil and an excitation source connected to the exciting coil, and is configured to use the exciting current flowing through the exciting coil as a current source to supply the phase shifter with the exciting current.

3. A car position detector according to claim 1, further comprising a second test coil, which is to be arranged so as to be opposed to the exciting coil with a gap, and is configured to use the exciting current flowing through the exciting coil as a current source to supply the phase shifter with the exciting current.

* * * * *